United States Patent
Oguro (10) Patent No.: US 9,639,304 B2
(45) Date of Patent: May 2, 2017

(54) DATA SUPPLYING DEVICE AND IMAGE PROCESSING SYSTEM

(71) Applicant: BROTHER KOGYO KABUSHIKI KAISHA, Nagoya-shi, Aichi-ken (JP)

(72) Inventor: Yuki Oguro, Nagoya (JP)

(73) Assignee: BROTHER KOGYO KABUSHIKI KAISHA, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/659,133

(22) Filed: Mar. 16, 2015

(65) Prior Publication Data

US 2015/0277837 A1 Oct. 1, 2015

(30) Foreign Application Priority Data

Mar. 25, 2014 (JP) ................. 2014-061816

(51) Int. Cl.
G06F 3/12 (2006.01)
(52) U.S. Cl.
CPC .......... G06F 3/1211 (2013.01); G06F 3/1206 (2013.01); G06F 3/1243 (2013.01); G06F 3/1253 (2013.01); G06F 3/1288 (2013.01)
(58) Field of Classification Search
CPC combination set(s) only.
See application file for complete search history.

(56) References Cited

U.S. PATENT DOCUMENTS

| | | | |
|---|---|---|---|
| 2004/0181747 A1 | 9/2004 | Hull et al. | |
| 2005/0052695 A1* | 3/2005 | Fukunaga | G06F 17/30265 358/1.15 |
| 2007/0019222 A1 | 1/2007 | Oda et al. | |
| 2009/0228508 A1* | 9/2009 | Date | H04N 5/76 |
| 2010/0238471 A1* | 9/2010 | Sakiyama | G06F 3/1206 358/1.9 |
| 2013/0198865 A1* | 8/2013 | Iwasaki | G06F 21/62 726/28 |
| 2015/0022857 A1 | 1/2015 | Tsugimura | |
| 2015/0022861 A1 | 1/2015 | Oguro | |

FOREIGN PATENT DOCUMENTS

| | | |
|---|---|---|
| JP | 2000-148340 A | 5/2000 |
| JP | 2007-041914 A | 2/2007 |
| JP | 2009-098974 A | 5/2009 |

OTHER PUBLICATIONS

U.S. Office Action issued in co-pending U.S. Appl. No. 14/335,030, dated Mar. 11, 2015.
Office Action issued in related U.S. Appl. No. 14/335,030, Nov. 19, 2015.
U.S. Office Action issued in co-pending U.S. Appl. No. 14/335,030, Jul. 1, 2015.
Office Action (Notice of Allowance) issued in related U.S. Appl. No. 14/335,030, Mar. 11, 2016.

* cited by examiner

Primary Examiner — Henok A Shiferaw
(74) Attorney, Agent, or Firm — Merchant & Gould P.C.

(57) ABSTRACT

A data supplying device may storing a file including contents data in a storage, send, to a data generating unit, a file which has the same content as the file in the storage, specify a first type of contents data from the file in the storage, store the specified first type of contents data in a memory, obtain access information for accessing the first type of contents data stored in the memory, and output image data representing an image indicating the obtained access information in order to cause a print performing unit to print the image indicating the obtained access information.

16 Claims, 8 Drawing Sheets

DATA SUPPLYING DEVICE AND IMAGE PROCESSING SYSTEM

CROSS-REFERENCE TO RELATED APPLICATION

This application claims priority to Japanese Patent Application No. 2014-061816, filed on Mar. 25, 2014, the contents of which are hereby incorporated by reference into the present application.

TECHNICAL FIELD

A technique disclosed in this specification relates to a data supplying device configured to supply data for printing.

DESCRIPTION OF RELATED ART

A document browsing support system for performing a print process of a document file including a hyperlink has been known. In the document browsing support system, in a case where a document file on which the print process is to be performed includes a hyperlink, a barcode indicating a link destination address is generated, and is inserted to the document file.

BRIEF SUMMARY OF INVENTION

In this specification, a technique is provided with which appropriate data may be supplied to a print performing unit, when an image represented by a file including contents data is to be printed.

A data supplying device taught in the present specification may comprise a processor and a storage that stores computer-readable instructions. The computer-readable instructions, when executed by the processor, may cause the data supplying device to perform: storing a file including contents data in the storage; sending, to a data generating unit, a file which has the same content as the file in the storage, the data generating unit configured to generate, by using the file which has been sent to the data generating unit, print data to be printed by a print performing unit; specifying a first type of contents data from the file in the storage, an output content of the first type of contents data being changeable when an image represented by the file is displayed; storing the specified first type of contents data in a memory; obtaining access information for accessing the first type of contents data stored in the memory; and outputting image data representing an image indicating the obtained access information in order to cause the print performing unit to print the image indicating the obtained access information.

A control method and computer-readable instructions for implementation of the data supplying device described above, and a non-transitory computer-readable recording medium in which the computer-readable instructions are stored, are also novel and useful. Furthermore, an image processing system comprising a data supplying device and a data generating device is also novel and useful.

BRIEF DESCRIPTION OF DRAWINGS

FIG. 4 is a sequence diagram for describing a case where print data of a document file and print data of an access file are generated in response to a request from a PC and the like;

FIG. 5 is a diagram for describing a case where the print data of the document file and the print data of the access file are generated in response to the request from the PC and the like;

EMBODIMENT

Embodiments of a technique disclosed in this specification are described with reference to the drawings. The technique disclosed in this specification is not particularly limited to the embodiments described below, and may be implemented in various embodiments.

(Configuration of Communication System 1)

Figure 1:
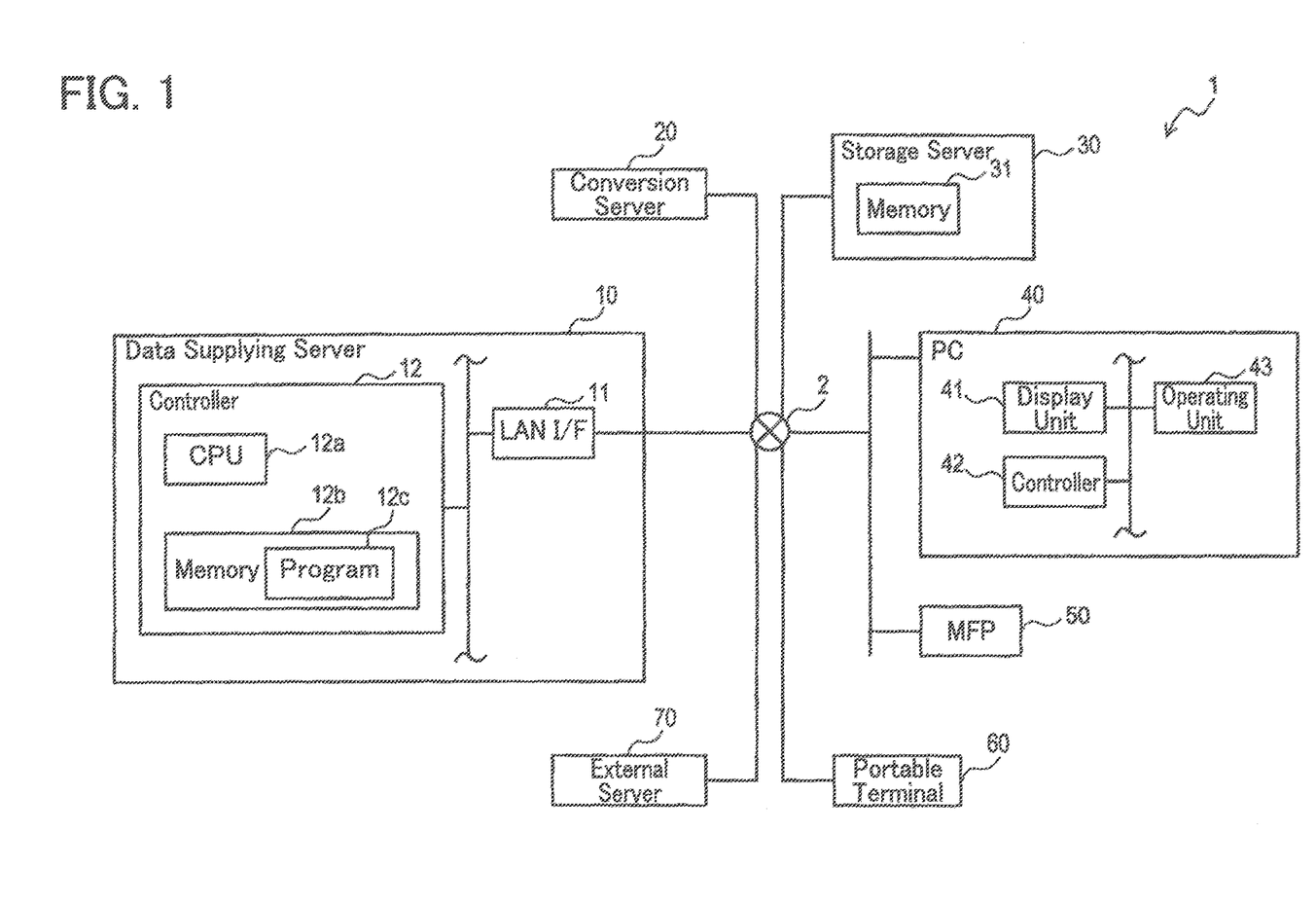
FIG. 1 is a block diagram showing a configuration of a communication system.

As shown in FIG. 1, a communication system 1 comprises a data supplying server 10, a conversion server 20, a storage server 30, and one or more external devices. These devices can communicate with each other through the Internet 2. The external devices are, for example, a PC 40, a MFP (i.e. Multi-Function Peripheral) 50, a portable terminal 60 configured as a smartphone and the like, an external server 70, and the like.

(Configurations of Servers 10, 20, 70)

The data supplying server 10 comprises a LAN interface 11 and a controller 12. The LAN interface 11 is an interface via which the data supplying server 10 communicates with the Internet 2.

The controller 12 comprises a CPU 12a and a memory 12b. The CPU 12a performs various types of processing in accordance with a program 12c stored in the memory 12b. The memory 12b is configured by a ROM, a RAM, a hard disk, and the like. The memory 12b stores therein the program 12c performed by the CPU 12a.

Each of the conversion server 20 and the external server 70 also comprises a LAN interface and a controller that are similar to those in the data supplying server 10.

(Configuration of Storage Server 30)

The storage server 30 comprises a LAN interface and a controller that are similar to those in the data supplying server 10, and further comprises a memory 31. The memory 31 is configured by a ROM, a RAM, a hard disk, and the like. The storage server 30 can store therein data sent (that is, uploaded) from the data supplying server 10 through the Internet 2. The storage server 30 can store one or more folders for storing data, in the memory 31. The storage server 30 is provided with a unique URL (abbreviation of Uniform Resource Locator) indicating a position of a folder on the Internet 2.

(Configurations of PC 40 and Portable Terminal 60)

The PC 40 comprises a display unit 41, a controller 42 and an operation unit 43. A user can cause the PC 40 to generate a document file by operating the operation unit 43. The document file is a data file defined by PDF (abbreviation of Portable Document Format). The document file defined by the PDF includes one or more items of object data. In other words, it can be regarded that the one or more items of object data are embedded in the document file defined by the PDF. The document file defined by the PDF has a tree structure configured by the one or more items of object data.

The object data included in the document file is text data and/or contents data. The contents data is, for example, movie data defined by FLU (abbreviation of Flash Video) format, still image data defined by JPEG (abbreviation of Joint Photographic Experts Group) format, audio data defined by MP3 (abbreviation of MPEG Audio Layer-3) format, and the like.

The contents data is output by an output device such as the display unit 41 for example. The user can play a movie represented by movie data, by performing a predetermined operation on the operation unit 43, while an image represented by a document file is displayed on the display unit 41. Furthermore, the user can play audio represented by audio data, by performing the predetermined operation on the operation unit 43, while the image represented by the document file is displayed on the display unit 41. Thus, the movie data and the audio data are data of which each output content is changeable when the image represented by the document file is displayed on the display unit 41. The contents data, of which the output content of the contents data changeable when the image represented by the document file is displayed on the display unit 41, is hereinafter referred to as a "first type of contents data".

The user can change a size of the image represented by the text data by performing a predetermined operation on the operation unit 43, but cannot change a display content of the image represented by the text data, while the image represented by the document file is displayed on the display unit 41. Thus, the text data is data of which a display content is not capable of changing while the image represented by the document file is displayed on the display unit 41. The contents data, of which display content is not changeable when the image represented by the document file is displayed on the display unit 41, is hereinafter referred to as a "second type of contents data". The still image data also includes the same configuration as the text data. One or more items of object data each further include position information indicating a position of the contents data in the image represented by the document file.

The controller 42 comprises a CPU and a memory. The controller 42 performs processing in accordance with an operation performed by the user on the operation unit 43. The portable terminal 60 also comprises a display unit, a controller, and an operation unit that are similar to those in the PC 40. The user can cause the portable terminal 60 to generate the document file described above by operating the operation unit.

(Configuration of MFP 50)

The MFP 50 has a printer function, a scanner function, a facsimile function, a copy function, and the like. The MFP 50 performs a print process upon receiving data to be printed. In the print process, the MFP 50 prints an image represented by the data as a target of the print process on a print medium set in the MFP 50.

Figure 2:
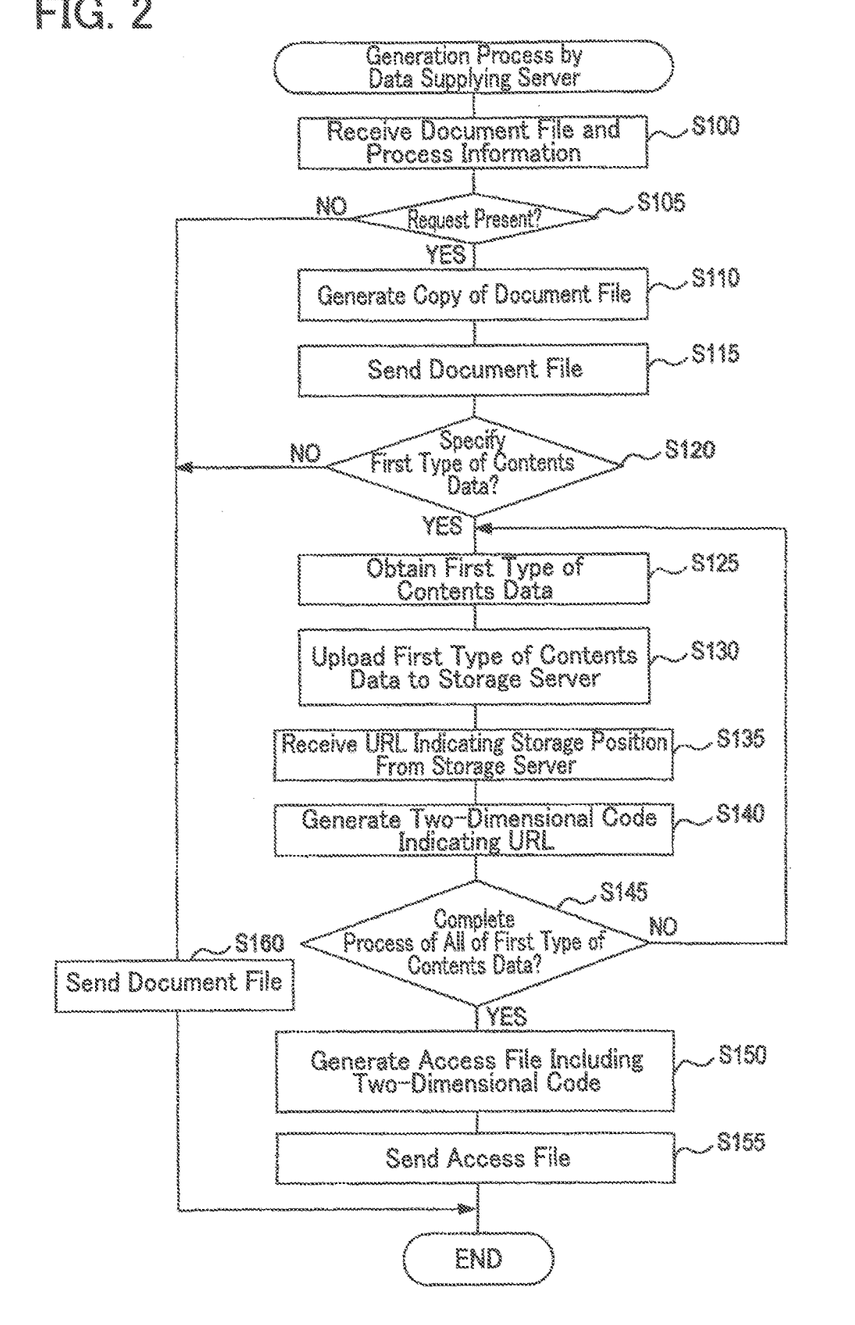
FIG. 2 is a flowchart showing generation processing performed by a data supplying server.

(Generation Process Performed by Data Supplying Server 10: FIG. 2)

The CPU 12a of the data supplying server 10 monitors reception of a combination of a document file and process information from, for example, the external device such as the PC 40, the MFP 50, the portable terminal 60, or the external server 70 through the Internet 2, while the data supplying server 10 is under operation. The process information indicates a process to be performed to the document file forming the combination with the process information. The process information includes address information (for example, an IP address) indicating a destination of an external device to which the document file is to be sent. Further, in a case where the process to be performed on the document file is a print process, the process information includes a print condition (a sheet size, a number of copies, and the like, for example) which has been set by the user and information indicating whether a two-dimensional code needs to be printed. Notably, the two-dimensional code indicates a URL indicating a position in which the first type of contents data which has been specified from the document file is stored (described in detail later).

As shown in FIG. 2, in S100, the CPU 12a receives the combination of the document file and the process information sent from the external device, and stores the document file and the process information in the memory 12b. Then, in S105, the CPU 12a refers to the process information and determines whether printing of the two-dimensional code of the URL indicating the position on the Internet 2 in which the first type of contents data included in the document file is stored, has been requested. The CPU 12a proceeds to S110 if it is determined in S105 that the printing has been requested (YES in S105), whereas proceeds to S160 if it is determined in S105 that the printing has not been requested (NO in S105).

The print condition and the request for printing the two-dimensional code can be set on a print setting screen 100 (referred to FIG. 3) displayed on the PC 40, the portable terminal 60 or the like from which the document file is sent. On the print setting screen 100, the print condition such as the sheet size and the number of copies can be set. Further, the printing of the two-dimensional code can be requested by selecting "Multimedia Print" as a print mode 101 on the print setting screen 100. The printing of the two-dimensional code is not requested when "Normal Print" is selected as the print mode 101. One of "Multimedia Print" and "Normal Print" is inevitably selected in the print setting screen 100.

In S110, the CPU 12a generates a copy of the received document file, and the CPU 12a proceeds to S115. In S115, the CPU 12a specifies an ID (for example, a file name and the like) of the received document file from the received document file (or copied document file), and sends one of the original document file and the copied document file and the process information to the conversion server 20. As a modification, the CPU 12a may generate an ID of the document file to be sent, and send the document file with the ID. Further, as a modification, the copy of the document file may not be generated, and the original document file and the process information may be directly sent to the conversion server 20 without erasing the document file stored in the memory 12b.

Then, in S120, the CPU 12a specifies the first type of contents data from the document file that has not been sent in S115. More specifically, the CPU 12a checks a content of one or more items of object data included in the document file. The CPU 12a specifies the checked object data as the first type of contents data, in a case where the checked object data includes information indicating that the data is the first type of contents data.

If the first type of contents data is specified in S120 (YES in S120), the CPU 12a proceeds to S125. On the other hand, if the first type of contents data is not specified in S120 (NO in S120), the CPU 12a proceeds to S160. In S125, the CPU 12a obtains, from the document file, the first type of contents data specified in S120. Specifically, the CPU 12a generates a copy of the first type of contents data specified in S120, separately from the document file. Thus, in S125, the first type of contents data is not erased from the document file, and thus is kept in a state of being included in the document file. As a modification, when the CPU 12a obtains, from the document file, the first type of contents data specified in S120, the CPU 12a may erase the obtained first type of contents data from the document file.

Then, in S130, the CPU 12a uploads contents data including the first type of contents data obtained in S125 to be stored in the storage server 30 through the Internet 2. Thus, the data supplying server 10 does not need to store the first type of contents data.

Then, in S135, the CPU 12a receives a URL indicating a position on the Internet 2 of the contents data stored in the storage server 30, from the storage server 30 through the Internet 2. In S140, the CPU 12a generates a two-dimensional code indicating the URL received in S135, further generate a second type of contents data representing the generated two-dimensional code, and proceeds to S145. As a modification, the CPU 12a may generate any one of a barcode, a character string, and a path name for indicating the URL received in S135. The CPU 12a may designate a storage destination (for example, a URL indicating the position in which the first type of contents data is stored) of the first type of contents data. In such a case, the process in S135 is not performed, and in S140, a two-dimensional code indicating the URL designated by the CPU 12a is generated.

In S145, the CPU 12a determines whether the processes from S125 to S140 have been completed on all the items of first type of contents data specified in S120. If there is the first type of contents data on which the processes from S125 to S140 have not been completed (NO in S145), the CPU 12a returns to S125. If the processes from S125 to S140 have been completed on all the items of first type of contents data (YES in S145), the CPU 12a proceeds to S150.

In S150, the CPU 12a generates an access file as data for printing an image including all the items of second type of contents data generated in S140. The access file is a file defined by the PDF. Then, in S155, the CPU 12a adds a tag indicating the ID of the document file which has been sent in S115 to the access file, sends the resultant access file to the conversion server 20, and terminates the present process. As a modification, the CPU 12a may specify an ID (such as a file name, for example) of the access file, or may add an ID to the access file. Subsequently, the CPU 12a may send association data to the conversion server 20. The association data herein indicates that the ID of the access file which has been specified (or added) and the ID of the document file which has been sent in S115 are associated with each other. Thus, the conversion server 20 can specify the association between the received access file and the received document file based on the association data.

In the meantime, in S160 to which the CPU 12a proceeds when it is determined in S105 that the printing of the two-dimensional code has not been requested, the CPU 12a sends the received document file and the received process information to the conversion server 20.

Figure 4:
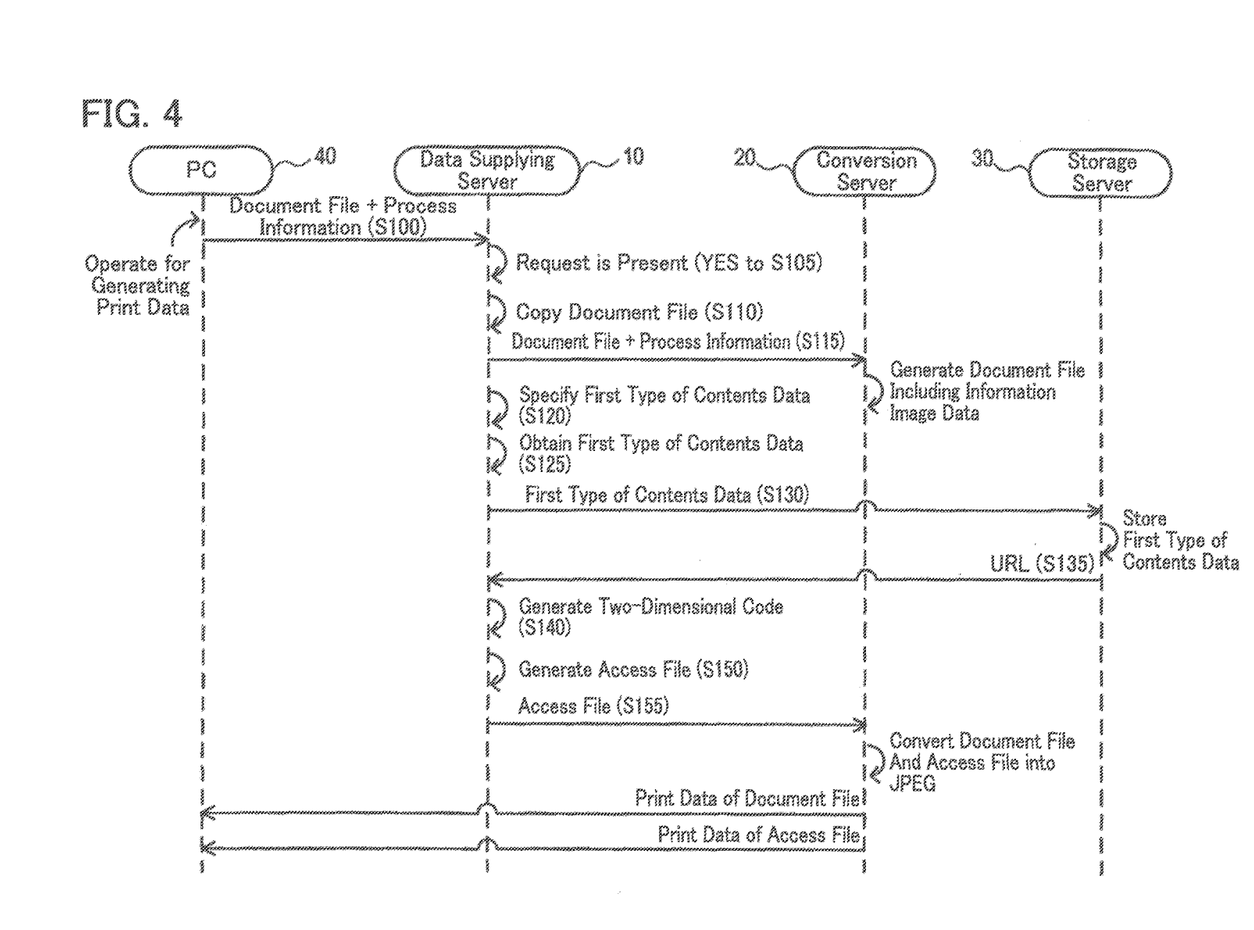
Figure 5:
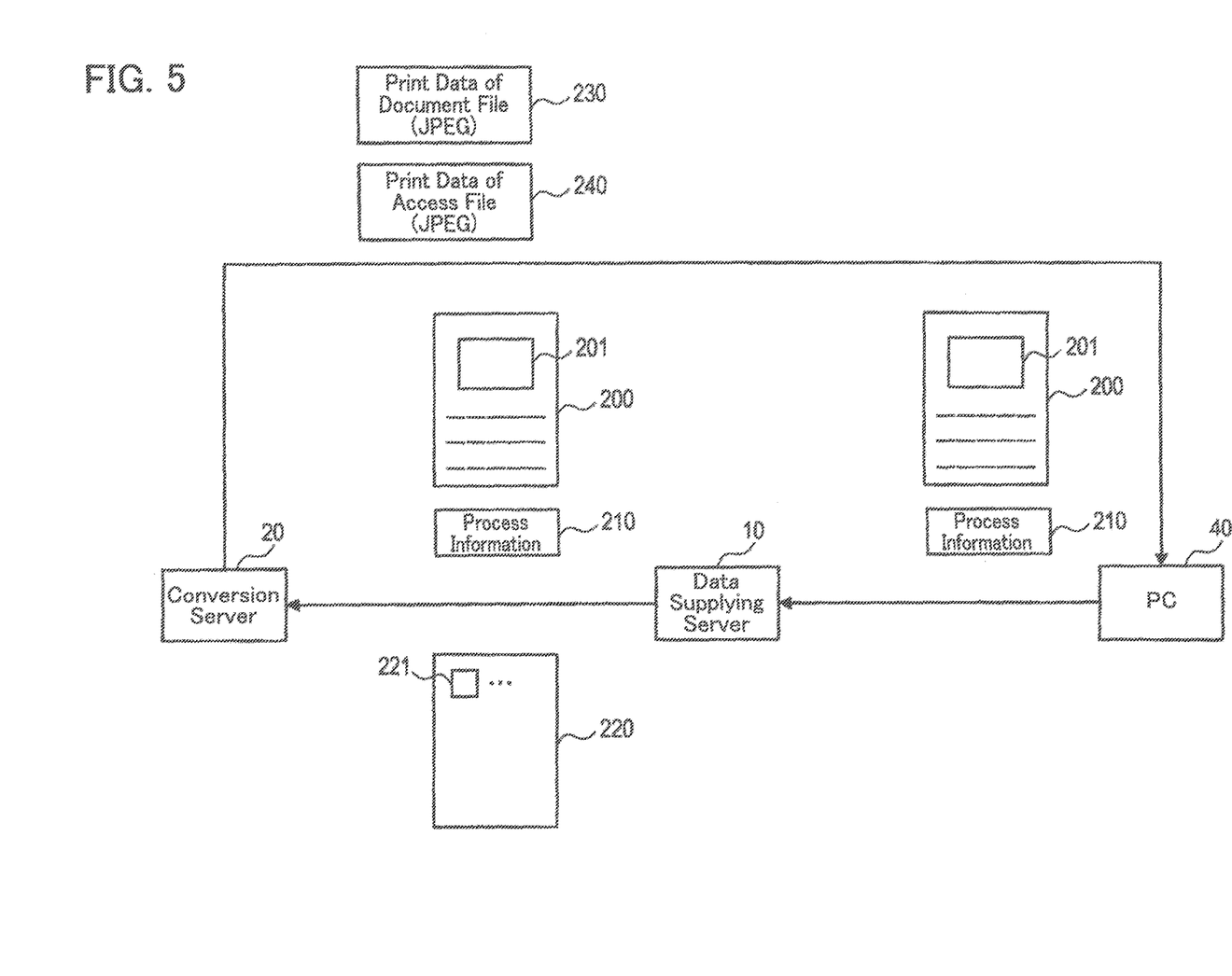

(Case where Document File is Received from the PC 40 and the Like: FIGS. 4 and 5)

The user of the PC 40, the MFP 50, or the portable terminal 60 can perform, by operating an operation unit, a print data generating operation for causing the data supplying server 10 and the conversion server 20 to generate print data based on a document file 200. The print data generating operation includes an operation for selecting the document file 200 on which the printing is to be performed, an operation for setting a print condition, and the like.

In the description given below, a case is described where the print data generation operation is performed in the PC 40, and the document file 200 and the like are sent from the PC 40 to the data supplying server 10. It should be mentioned that similar processing is performed also in cases where the print data generating operation is performed in the MFP 50 and the portable terminal 60.

If the print data generating operation is performed in the PC 40, the PC 40 which operates in accordance with a printing application sends process information 210 and the selected document file 200 to the data supplying server 10, the process information 210 herein including a destination of the print data (address information of the PC 40, for example) and the print condition. Upon receiving a combination of the document file 200 and the process information 210 (S100 in FIG. 2), the data supplying server 10 generates a copy of the document file 200 (S110 in FIG. 2) if a printing of the two-dimensional code has been requested (YES in S105 in FIG. 2).

The data supplying server 10 sends the document file 200, which is one of the original document file and the copied document file, to the conversion server 20 together with the process information 210 (S115 in FIG. 2). Further, the data supplying server 10 obtains a first type of contents data 201 from the document file 200 (YES in S120 and S125 in FIG. 2), which is another one of the original document file and the copied document file, and uploads the first type of contents data 201 to the storage server 30 (S130 in FIG. 2).

Upon receiving the first type of contents data 201 from the data supplying server 10, the storage server 30 stores the first type of contents data 201 in the memory 31. Then, the storage server 30 sends a URL indicating a position of the contents data stored in the memory 31 on the Internet 2, to the data supplying server 10.

Upon receiving the URL from the storage server 30 (S135 in FIG. 2), the data supplying server 10 generates a two-dimensional code indicating the URL and generates a second type of contents data representing the two-dimensional code (S140 in FIG. 2).

When the processing is completed on all the items of first type of contents data included in the document file (YES in S145 in FIG. 2), the data supplying server 10 generates an access file 220 (S150 in FIG. 2) for printing an image including all the items of second type of contents data 221 (two-dimensional code) which have been generated. The data supplying server 10 sends the generated access file 220 to the conversion server 20 (S155 in FIG. 2).

In the meantime, the conversion server 20 which has received the document file 200 determines whether information image data corresponding to each item of first type of contents data 201 included in the document file 200 is included in the document file 200. Then, in a case where the information image data corresponding to the first type of contents data 201 is not included in the document file 200, the conversion server 20 generates information image data corresponding to the first type of contents data 201. More specifically, if the first type of contents data 201 is movie data, information image data representing a still image at a point when a play time is 0 second may be generated. If the first type of contents data 201 is audio data, information image data representing a play button may be generated. Further, the conversion server 20 generates a document file including the information image data corresponding to the first type of contents data 201, instead of the first type of contents data 201.

Next, the conversion server 20 generates JPEG data based on the document file 200 including the information image data, in accordance with the print condition included in the process information 210. The JPEG data herein serves as print data 230 of the document file.

The conversion server 20 generates JPEG data based on the received access file 220, upon receiving the access file 220 from the data supplying server 10 (S155 in FIG. 2). The JPEG data serves as print data 240 of the access file.

Further, the conversion server 20 specifies a combination of the document file 200 and the access file 220 associated with each other. In other words, the conversion server 20 specifies a combination of the document file 200 and the access file 220 for printing the two-dimensional code indicating the URL indicating the stored position of the first type of contents data specified from the document file 200. More specifically, the conversion server 20 may specify the document file 200 indicated by the tag added to the access file 220, and may specify the access file 220 and the document file 200 as the combination mentioned above. As a modification, the conversion server 20 that has received the association data described above may specify the combination based on the association between the ID of the document file 200 and the ID of the access file 220 indicated by the association data.

The conversion server 20 sends one print job (i.e. single print job) to the destination indicated by the address information (for example, the PC 40 that has sent the document file 200 in FIG. 5) in the process information 210, the one print job being configured by a combination of the print data 230 of the document file 200 and the print data 240 of the access file 220.

Figure 3:
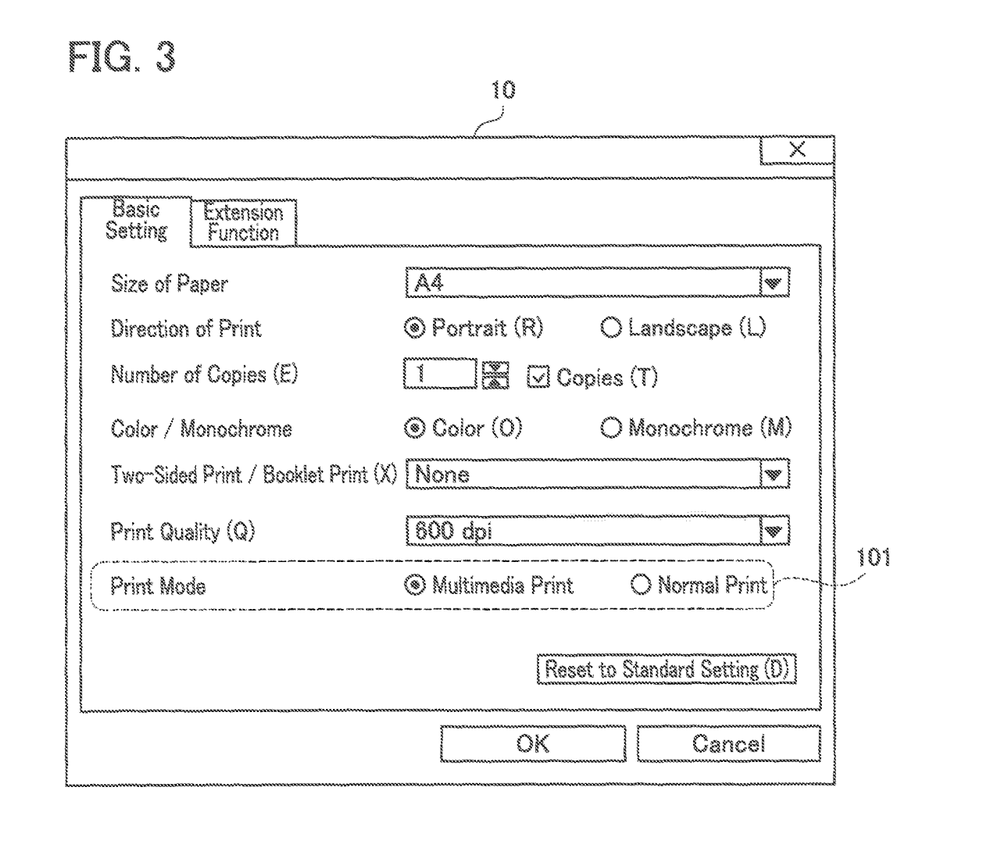
FIG. 3 is a diagram for describing a print setting screen.

Upon receiving the print data 230 and 240 of the document file 200 and the access file 220, the PC 40 stores the print data 230 and 240 in a memory. The PC 40 sends the print data 230 and 240 to the MFP 50 and the like in accordance with an instruction from the user, whereby the printing is performed. In the PC 40, setting information may be set on the print setting screen 100, the setting information including selection of a printer device (MFP 50, for example) for printing the image indicated by print data. The PC 40 may send the received print data 230 and 240 to the MFP 50 in accordance with the setting information including the selection of the printer device. Alternatively, the conversion server 20 may send the print data 230 and 240 to the MFP 50 in accordance with the setting information. Further alternatively, the conversion server 20 may not specify the combination of the print data 230 and 240 and instead, the PC 40 or the MFP 50 may specify the combination of the print data 230 and 240 to be treated as a single print job, based on the IDs of the print data 230 and 240 sent from the conversion server 20.

Figure 6:
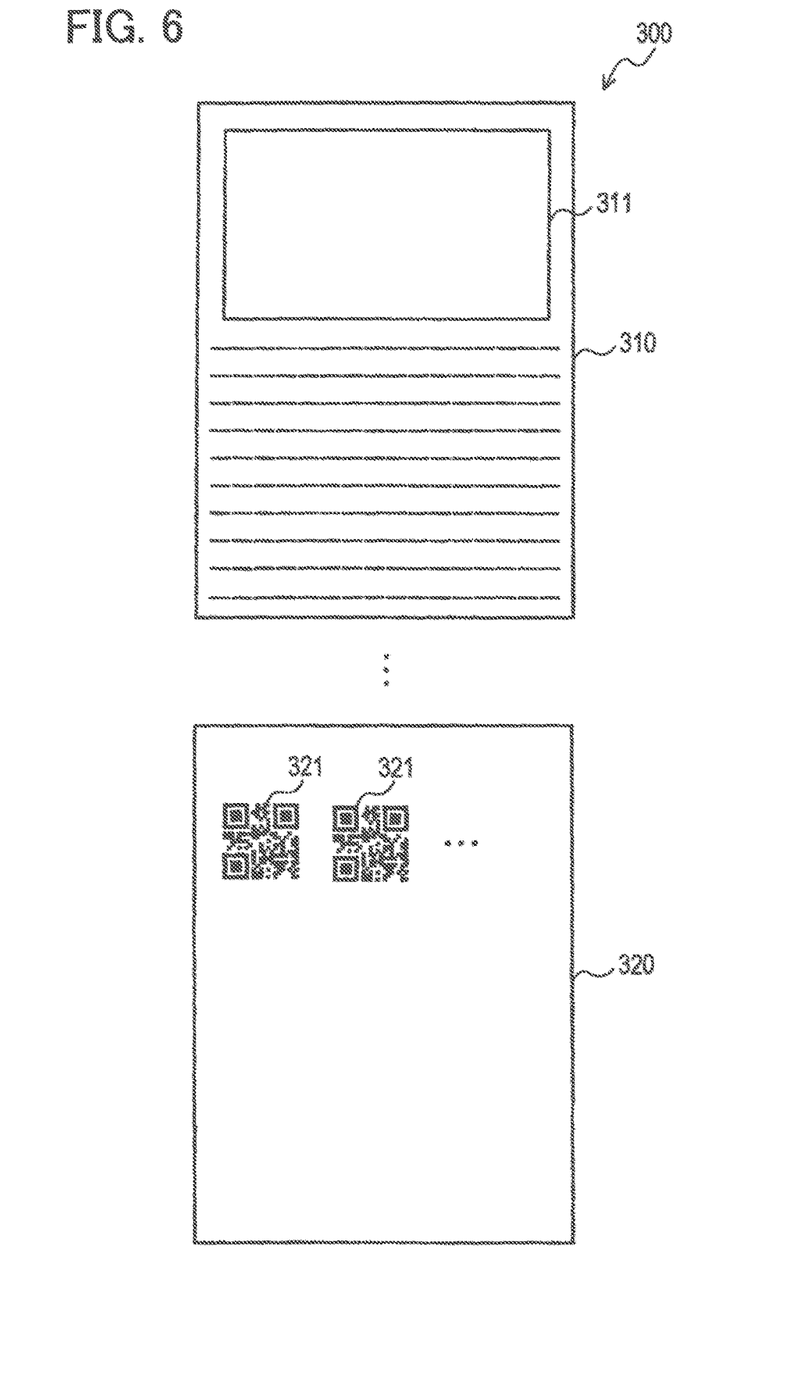
FIG. 6 is a diagram for describing a print image printed on a print medium based on the print data of the document file and the access file.

A print image 300 printed based on the print data 230 and 240 includes: a document page 310 including an image based on the document file 200; and a two-dimensional code page 320 that is based on the access file 220 and includes the two-dimensional codes (see FIG. 6). In the document page 310, a portion where the first type of contents data 201 had been described is replaced with an information image 311 based on the information image data corresponding to the first type of contents data 201. Further, the two-dimensional code page 320 includes one or more two-dimensional codes 321 each indicating the URL indicating the position of the first type of contents data specified from the document file 200, and is added to the document page 310 to appear after this document page 310. As a modification, the two-dimensional code page 320 may be added before the document page 310. In the example in FIG. 6, the two-dimensional code page 320 only includes the one or more two-dimensional codes 321. Alternatively, the one or more two-dimensional codes 321 may be arranged side by side with the information image 311 based on the information image data corresponding to the first type of contents data stored at the position indicated by the URL indicated by the one or more two-dimensional codes 321.

Figure 7:
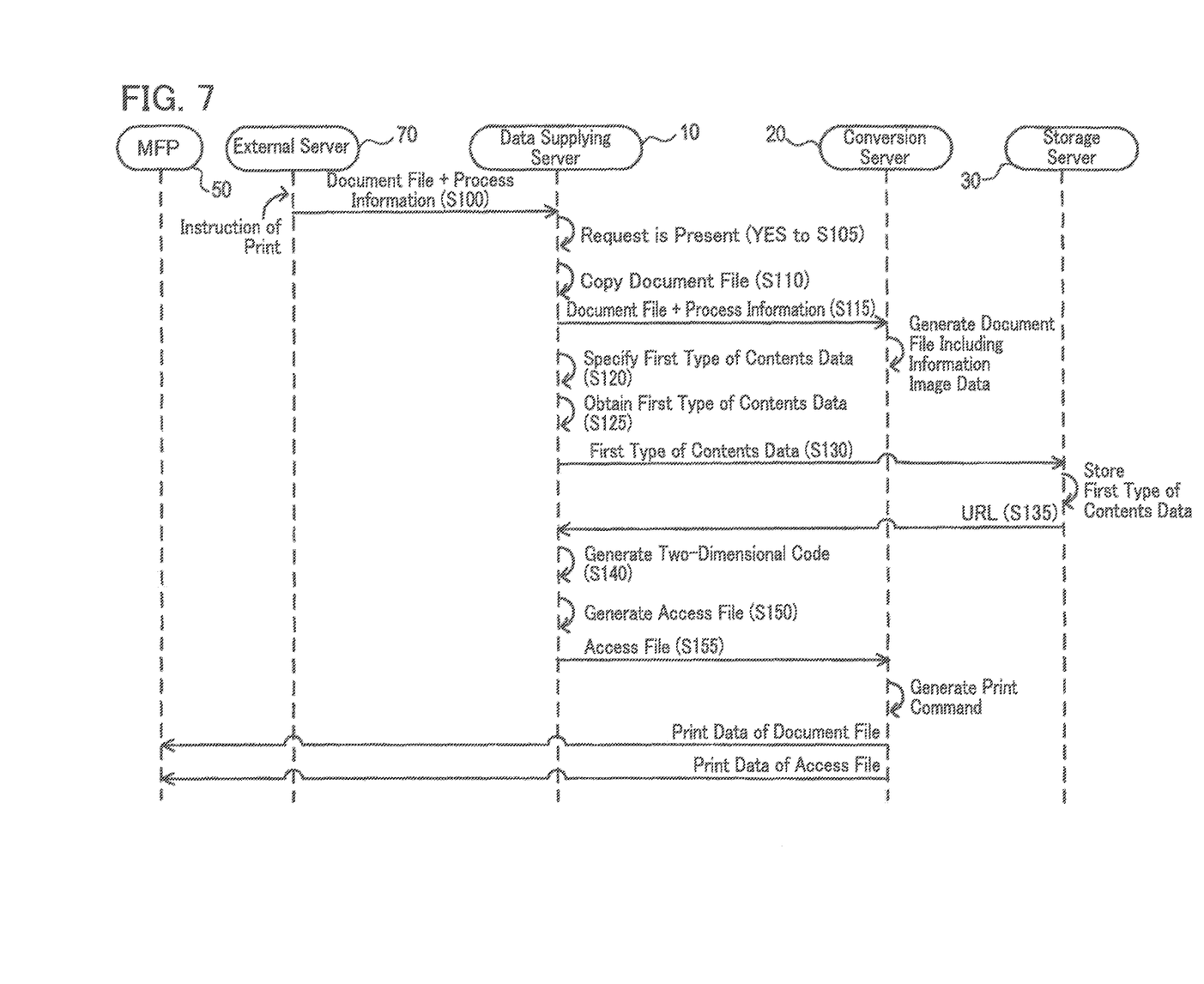
FIG. 7 is a sequence diagram showing a case where the print data of the document file and the print data of the access file are generated in response to a request from an external server.
Figure 8:
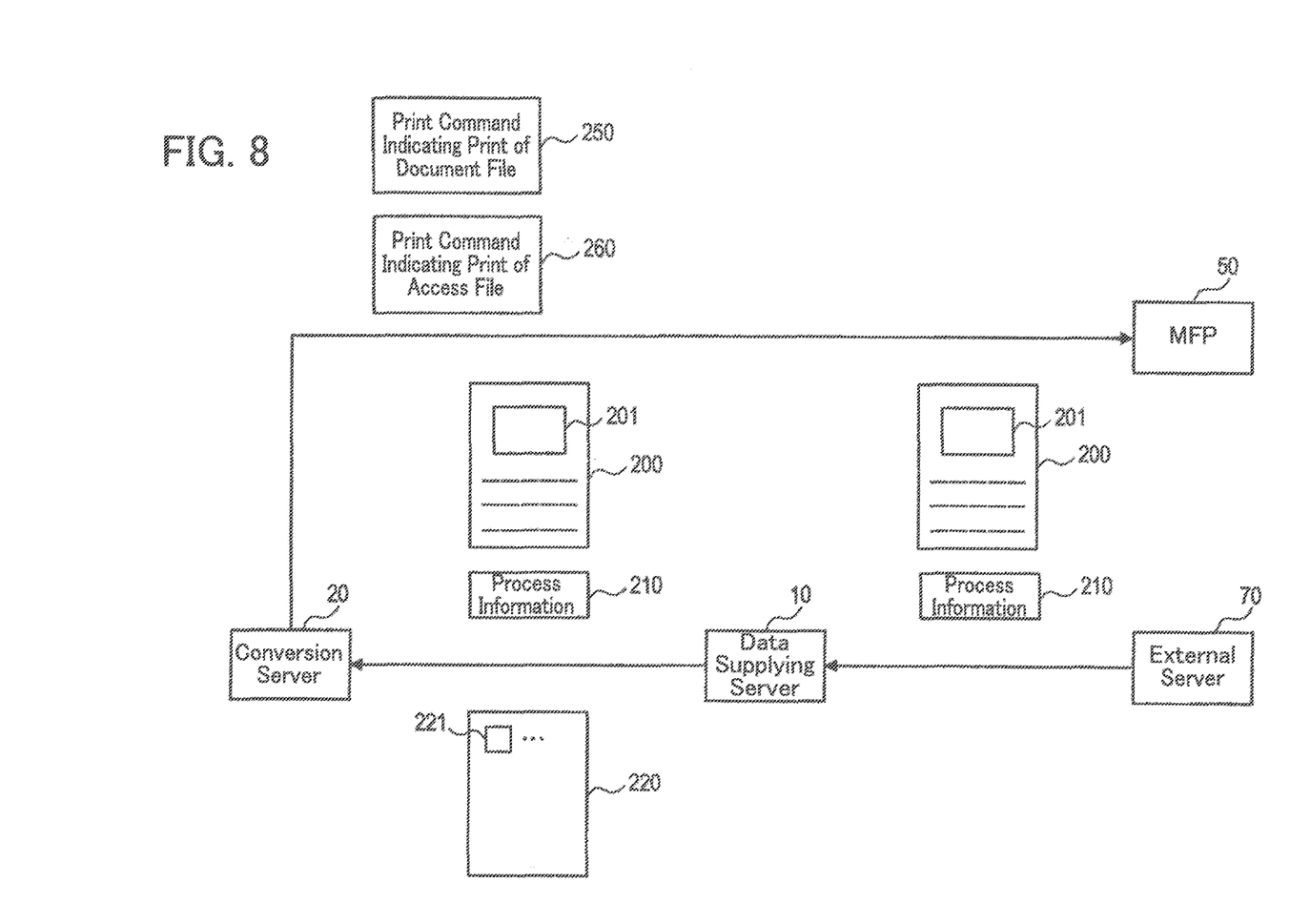
FIG. 8 is a diagram for describing a case where the print data of the document file and the print data of the access file are generated in response to the request from the external server.

(Case where Document File is Received from the External Server 70: FIGS. 7 and 8)

The external server 70 performs print processing of sending a document file 200 to the data supplying server 10 to cause the data supplying server 10 to generate print data, and causing the MFP 50 to perform printing based on the print data. For example, the external server 70 performs the print processing on the document file 200 and the like stored in the external server 70, in accordance with a print instruction from the PC 40, the portable terminal 60, the MFP 50 or the like that has accessed the external server 70.

The external server 70 sends process information 210 including the address information of the MFP 50 as a destination of the print data and a print condition, and the selected document file 200 to the data supplying server 10, in accordance with the above print instruction. The print condition may be set in accordance with an operation performed by the user on the PC 40 and the like that has accessed the external server 70.

The processes from a point where the data supplying server 10 receives the combination of the document file 200 and the process information 210 to a point where the data supplying server 10 sends an access file 220 to the conversion server 20 (in other words, the processes performed in the data supplying server 10) are the same as those shown in FIGS. 4 and 5, and thus the description thereof is omitted.

The conversion server 20 that has received the document file 200 generates a document file including information image data corresponding to the first type of contents data 201 instead of the first type of contents data 201, as in FIGS. 4 and 5. Further, the conversion server 20 generates a print command 250 for instructing the MFP 50 to print the document file, based on the document file including the information image data, in accordance with the print condition in the process information 210. The print command 250 includes image data (print data) for printing the document file.

Upon receiving the access file 220 from the data supplying server 10 (S155 in FIG. 2), the conversion server 20 generates a print command 260 based on the access file 220. The print command 260 is generated for instructing the MFP 50 to print the access file 220. The print command 260 includes image data (print data) for printing the access file 220.

The conversion server 20 specifies the combination of the document file 200 and the access file 220 that are associated with each other as in FIGS. 4 and 5. Then, the conversion server 20 sends, to the destination (MFP 50 for example) indicated by the address information in the process information 210 received together with the document file 200, the print commands 250 and 260 based on the document file 200 and the access file 220 forming the specified combination.

The MFP 50 which has received the print commands 250 and 260 stores the image data (print data) of the document file in the print command 250 and the image data (print data) of the access file in the print command 260 in the memory, and performs printing based on these print data. Thus, a print image 300 similar to that shown in FIG. 6 is generated.

(Effect)

When an image represented by a document file has been printed, an image represented by the first type of contents data in a print result cannot be changed. Thus, the entire content in the first type of contents data cannot be recognized even by checking the print result. An attempt to convert the first type of contents data into a two-dimensional code might end up in a failure to convert the entire first type of contents data into the two-dimensional code, when a data size of the first type of contents data is excessively large. In the present embodiment, an access file is generated, the access file including the second type of contents data indicating a two-dimensional code indicating a position at which the first type of contents data is stored. Thus, when the access file is printed, the two-dimensional code is obtained from the print result, whereby the contents data stored in the storage server 30 can be accessed by using the obtained two-dimensional code.

Furthermore, the data supplying server 10 sends a document file, which has the same content as the document file used for obtaining the first type of contents data, to the conversion server 20. In the case where the document file is defined by the PDF in particular as in the present embodiment, the document file may include a plurality of pages. A larger number of pages imposes a larger processing load on the conversion server 20 and requires a longer time for a converting process into the JPEG format and the like. In addition, when the first type of contents data is specified from the object data as in the present embodiment, the entire document file needs to be analyzed for the first type of contents data to be specified, and thus a larger processing load is imposed. The process for generating the print data in the conversion server 20 and the process for obtaining the first type of contents data in the data supplying server 10, involving the large processing loads, are performed in parallel. Thus, it is capable of shortening a print processing time for images represented by the document file and the access file. The access file generated in the data supplying server 10 is also sent to the conversion server 20. The conversion server 20 generates the print data 240 from the received access file. Thus, the data supplying server 10 can generate the access file without having to pay attention to a format that the MFP 50 is capable of interpreting.

Thus, when an image represented by print data based on a document file including contents data is to be printed, appropriate data can be appropriately supplied to the conversion server 20.

Identification information indicating that a document file and an access file are associated with each other is added, whereby the association between the document file and the access file can be accurately recognized. The association information and the files are sent to the MFP 50 as a single print job, whereby the print data 230 and 240 can be provided to the user as a series of print targets.

Further, the process for generating the two-dimensional code is performed by setting information set on the print setting screen 100 indicating that the two-dimensional code is to be printed. Thus, an appropriate process can be performed at an appropriate timing, whereby the process load can be reduced. Furthermore, the setting information can be set together with another print setting information on the print setting screen 100, whereby a load of a setting operation on the user can be reduced as well.

The print data of the document file sent from the conversion server 20 includes the information image data. Furthermore, the conversion server 20 generates the information image data in the case where it is not determined that the document file includes the information image data. With this configuration, whether the first type of contents data is included in the document file sent from the PC 40 and the like, can be determined based on the information image data.

(Correspondence Relationship)

The data supplying server 10 is an example of a "data supplying device", the memory 12b of the data supplying server 10 is an example of a "storage", the conversion server 20 is an example of a "data generating unit" and "data generating device", the memory 31 of the storage server 30 is an example of a "memory", and the MFP 50 is an example of a "print performing unit" and "printer", the document file 200 is an example of a "file", and the two-dimensional code is an example of an "image indicating the obtained access information". Further, information indicating selection of "Multimedia Print" or "Normal Print" is an example of "specific setting information", and information indicating print setting is an example of "print setting information".

Further, the URL indicating the position on the Internet 2 of the first type of contents data is an example of "access information", the print condition indicated by the processing information is an example of "printing setting information", and the tag added to the access file 220 is an example of "identification information".

Other Embodiments (1) In the present embodiment, the data supplying server 10 generates the access file defined by the PDF and sends the access file to the conversion server 20.

Alternatively, the data supplying server 10 may generate an access file defined by the JPEG format after sending a document file to the conversion server 20, and send the access file as print data to the PC 40, the MFP 50, or the like as the destination. That is, while the print data of the document file is sent from the conversion server 20 to the destination, the print data of the access file may be sent from the data supplying server 10 to the destination.

At this occasion, a tag may be added to each of the print data of the document file sent from the conversion server 20 and the print data of the access file sent from the data supplying server 10, respectively. Thus, the external device as the destination of the print data may use the added tags so as to recognize that the print data of the document file and the print data of the access file associated with each other are received.

The print data may not limited to the JPEG format and the print command, and any format which the MFP 50 is capable of interpreting may be employed. For example, the print data generated in the embodiment shown in FIG. 4 and the like may be sent in the print command and the print data generated in the embodiment shown in FIG. 7 and the like may be sent in the JPEG format.

In the present embodiment, the data supplying server 10 receives the document file 200 from the PC 40 and the like in the print data generation operation. However, this should not be construed in a limiting sense. For example, the data supplying server 10 and the conversion server 20 may perform the above processing when an operation for causing a document file defined by the PDF to be displayed in the JPEG format is performed on the PC 40 and the like. Then, the document file in the JPEG format sent by the conversion server 20 may be displayed on the PC 40 and the like. Here, the print data generated based on the access file may also be displayed together. The user may operate the operation unit of a PC and the like so as to send the document file defined by the JPEG format, displayed on the PC 40 and the like, to the MFP 50 as the print data. In this case, the data supplying server 10 may generate an access file regardless of whether the setting information for requesting the printing of the two-dimensional code has been set or not. The user may perform a setting to request the printing of the two-dimensional code by operating the operation unit in the state where the document file defined by the JPEG format is displayed. In this case, the print data based on the generated access file may be printed if the setting to request the printing of the two-dimensional code has been performed, whereas the print data based on the generated access file may not be printed if the setting to request the printing of the two-dimensional code has not been performed.

Further, the data supplying server 10, instead of the conversion server 20, may send the document file 200 and the access file 220 to the external device set as the destination in the processing information. Also in this case, the document file can be printed together with the access file, if the external device as the destination is the MFP 50 and the like that can perform printing based on a file defined by the PDF.

(2) The "data supplying device" may not be limited to the data supplying server 10, and may be any other devices such as a PC or an MFP that is communicably connected to an external device. The "external device" may be a printer and the like, in addition to the PC 40, the MFP 50, and the portable terminal 60. The "memory" may not be limited to the storage server 30 and may be a memory provided in the data supplying server 10 or the conversion server 20, or may be a memory in the PC 40 or the like.

(3) The "file" may not be limited to a file defined by the PDF, and may be a file in a data format that is capable of including the first type of contents data (a file defined by a PPT format, for example). Generally, the "file" is a file that may include the first type of contents data of which output content is capable of changing while the image represented by the document file is displayed on the display device.

(4) In the present embodiment, the CPU 12a of the data supplying server 10 checks the content of one or more items of object data in the document file so as to specify the first type of contents data (S120 in FIG. 2). Alternatively, the CPU 12a may specify the first type of contents data by specifying a character string (a character string "FLV", for example) indicating the data format of the first type of contents data among from character strings in the document file.

(5) In the present embodiment, the units of the data supplying server 10 are configured by software. Alternatively, at least one of the units of the data supplying server 10 may be configured by hardware such as a logical circuit and the like.

(6) The "first type of content data" may not be limited to movie data and audio data. The "first type of contents data" may be three-dimensional data representing a three dimensional shape, for example. While an image represented by a document file is displayed on a display device, the three dimensional shape represented by the three-dimensional data can be rotated. The "first type of content data" may be any data of which all information represented by the content data is unable to be obtained even when the first type of content data is printed and expressed two-dimensionally (e.g., displayed on a two-dimensional display). That is, the first type of content data" may be any data of which at least a part is broken among all the information represented by the contents data.

The invention claimed is:

1. A data supplying device comprising:
a processor; and
a storage that stores computer-readable instructions therein, the computer-readable instructions, when executed by the processor, causing the data supplying device to perform:
storing a file including a first type of contents data in the storage;
when print setting information and specific setting information is input together by a user into a first item and a second item, respectively, of a setting screen displayed on a display unit, obtaining both the print setting information and the specific setting information, the print setting information indicating a printing setting for printing an image represented by the file, the specific setting information indicating whether a specific image relating to the first type of contents data in the file is to be printed or not, an output content of the first type of contents data being changeable when the image represented by the file is displayed;
when the obtained specific setting information indicates that the specific image relating to the first type of contents data is to be printed:
sending, to a data generating unit, both a file which has the same content as the file in the storage and the obtained print setting information, in order to cause the data generating unit to generate first print data by using the sent file and print setting information, wherein the first print data is to be printed by a print performing unit;
specifying the first type of contents data from the file in the storage;
storing the specified first type of contents data in a memory;
obtaining access information indicating a storage position of the first type of contents data stored in the memory; and
outputting image data representing the specific image indicating the obtained access information in order to cause the print performing unit to print the specific image,
wherein, when the obtained specific setting information indicates that the specific image relating to the first type of contents data is not to be printed: causing the data supplying device to perform sending the file and print information to the data generating unit; and causing the data supplying device to not perform: the specifying of the first type of contents data, the storing of the specified first type of contents data, the obtaining of the access information, and the outputting of the image data indicating the access information.

2. The data supplying device as in claim 1, wherein
the outputting of the image data is performed by sending the image data to the data generating unit in order to cause the data generating unit to generate second print data by using the image data which has been sent to the data generating unit, wherein the second print data is printed by the print performing unit, and
each of the first print data and the second print data has a data format that the print performing unit is capable of interpreting.

3. The data supplying device as in claim 2, wherein
the file and the image data are sent to the data generating unit in order to cause the data generating unit to generate one print job including the first print data and the second print data.

4. The data supplying device as in claim 3, wherein
the image data is sent to the data generating unit, together with identification information for identifying the file, in order to cause the data generating unit to specify, by using the identification information, a combination of the file and the image data, and to generate the one print job based on the specified combination.

5. The data supplying device as in claim 1, wherein
a display content of the first type of contents data is changeable when the image represented by the file is displayed.

6. The data supplying device as in claim 1, wherein
the first type of contents data includes movie data.

7. The data supplying device as in claim 1, wherein
the first type of contents data includes audio data.

8. The data supplying device as in claim 1, wherein
in a case where a plurality of the first type of contents data is specified from the file in the storage, the specified plurality of first type of contents data is stored in the memory,
a plurality of the access information indicating storage positions of the plurality of first type of contents data stored in the obtained is obtained, and
the image data representing a plurality of images indicating the obtained plurality of access information is outputted in order to cause the print performing unit to print the plurality of images indicating the obtained plurality of access information.

9. The data supplying device as in claim 1, wherein
the first type of contents data is stored in the memory of a server which is connected with the data generating unit via a network.

10. The data supplying device as in claim 1, wherein
the sending of the file is performed by sending the file to the data generating unit via the Internet and
the specifying of the first type of contents data is performed in parallel with the data generating unit generating the first print data after the file has been sent to the data generating unit.

11. A non-transitory computer-readable recording medium storing computer-readable instructions for a data supplying device,
the computer-readable instruction, when executed by a processor of the data supplying device, causing the data-supplying device to perform:
storing a file including a first type of contents data in a storage;
when print setting information and specific setting information is input together by a user into a first item and a second item, respectively, of a setting screen displayed on a display unit, obtaining both the print setting information and the specific setting information, the print setting information indicating a printing setting for printing an image represented by the file, the specific setting information indicating whether a specific image relating to the first type of contents data in the file is to be printed or not, an output content of the first type of contents data being changeable when the image represented by the file is displayed;
when the obtained specific setting information indicates that the specific image relating to the first type of contents data is to be printed:
sending, to a data generating unit, both a file which has the same content as the file in the storage and the obtained print setting information, in order to cause the data generating unit to generate first print data by using the sent file and print setting information, wherein the first print data is to be printed by a print performing unit;
specifying the first type of contents data from the file in the storage;
storing the specified first type of contents data in a memory to a storage server;
obtaining access information indicating a storage position of the first type of contents data stored in the memory,
outputting image data representing the specific image indicating the obtained access information in order to cause the print performing unit to print the specific image,
wherein, when the obtained specific setting information indicates that the specific image relating to the first type of contents data is not to be printed: causing the data supplying device to perform sending the file and print information to the data generating unit; and causing the data supplying device to not perform: the specifying of the first type of contents data, the storing of the specified first type of contents data, the obtaining of the access information, and the outputting of the image data indicating the access information.

12. An image processing system comprising a data supplying device and a data generating device, wherein
the data supplying device comprises:
a processor; and
a storage that stores computer-readable instructions therein, the computer-readable instructions, when executed by the processor, causing the data supplying device to perform:
obtaining a printing instruction including a file including a first type of contents data from a terminal device;
storing the file in the storage;
when print setting information and specific setting information is input together by a user into a first item and a second item, respectively, of a setting screen displayed on a display unit, obtaining both the print setting information and the specific setting information, the print setting information indicating a printing setting for printing an image represented by the file, the specific setting information indicating whether a specific image relating to the first type of contents data in the file is to be printed or not, an output content of the first type of contents data being changeable when the image represented by the file is displayed;
when the obtained specific setting information indicates that the specific image relating to the first type of contents data is to be printed:
sending, to the data generating device via a network, both a file which has the same content as the file in the storage and the obtained setting information, in order to cause the data generating device to generate first print data by using the sent file and print setting information, wherein the first print data is to be printed by a print performing unit;
specifying the first type of contents data from the file in the storage,
storing the specified first type of contents data in a memory;
obtaining access information indicating a position of the first type of contents data stored in the memory, and outputting image data representing the specific image indicating the obtained access information in order to cause the print performing unit to print the specific image, wherein, when the obtained specific setting information indicates that the specific image relating to the first type of contents data is not to be printed: causing the data supplying device to perform sending the file and print information to the data generating unit; and causing the data supplying device not to perform: the specifying of the first type of contents data, the storing of the specified first type of contents data, the obtaining of the access information, and the outputting of the image data indicating the access information, wherein the data generating device is configured to:
when the obtained specific setting information indicates that the specific image relating to the first type of contents data to be printed, generate, by using the file and the obtained print setting information which have been received from the data supplying device via the network, the first print data to be printed by the print performing unit.

13. The image processing system as in claim 12, wherein the data generating device is configured to send the generated first print data to the terminal device via the Internet.

14. The image processing system as in claim 12, wherein the data generating device is configured to send the generated first print data to the printer via the Internet.

15. The image processing system as in claim 12, wherein the data generating device is configured to obtain the image data outputted from the data supplying device via the network, the data generating device is configured to generate, by using the obtained image data, second print data to be printed by the print performing unit.

16. The image processing system of claim 15, wherein the data generating device is configured to send, to the print performing unit, one print job including the first and second print data in order to cause the print performing unit to print.

\* \* \* \* \*

UNITED STATES PATENT AND TRADEMARK OFFICE
CERTIFICATE OF CORRECTION

PATENT NO.        : 9,639,304 B2  
APPLICATION NO.   : 14/659133  
DATED             : May 2, 2017  
INVENTOR(S)       : Yuki Oguro Page 1 of 1

It is certified that error appears in the above-identified patent and that said Letters Patent is hereby corrected as shown below:

In the Claims

Claim 11
Column 14, Line 7: Delete "to a storage server;".

Signed and Sealed this
Sixth Day of February, 2018

Joseph Matal
*Performing the Functions and Duties of the
Under Secretary of Commerce for Intellectual Property and
Director of the United States Patent and Trademark Office*